US 6,644,055 B2

(12) United States Patent
Ohta et al.

(10) Patent No.: US 6,644,055 B2
(45) Date of Patent: Nov. 11, 2003

(54) VEHICLE AIR CONDITIONING SYSTEM

(75) Inventors: Hiromi Ohta, Okazaki (JP); Yasuhiko Niimi, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/245,804

(22) Filed: Sep. 16, 2002

(65) Prior Publication Data
US 2003/0051495 A1 Mar. 20, 2003

(30) Foreign Application Priority Data
Sep. 17, 2001 (JP) ........................................ 2001-281937

(51) Int. Cl.[7] .............................. F25B 49/00; F25B 1/00
(52) U.S. Cl. ........................................ 62/228.5; 62/229
(58) Field of Search .............................. 62/228.5, 230, 62/133, 226, 241, 244, 323.4, 229; 165/44; 417/212

(56) References Cited

U.S. PATENT DOCUMENTS 5,934,089 A * 8/1999 Nakagawa et al. ............ 62/133
6,367,270 B2 * 4/2002 Niimi et al. .................. 62/133
2001/0010261 A1 * 8/2001 Oomura et al. ................ 165/42
2002/0157414 A1 * 10/2002 Iwanami et al. ............... 62/239
2003/0068232 A1 * 4/2003 Iwanami et al. .............. 417/212

FOREIGN PATENT DOCUMENTS

JP          2000-179374          6/2000

* cited by examiner

Primary Examiner—Marc Norman
(74) Attorney, Agent, or Firm—Harness, Dickey & Pierce, PLC

(57) ABSTRACT

A vehicle air conditioning system mountable on a vehicle has the control function of stopping a vehicle engine automatically when the vehicle stops (eco-run vehicle). The system includes a variable displacement compressor driven by the vehicle engine, and a stop time of the vehicle engine is ensured when the vehicle stops. When the engine is running, the displacement of the variable displacement compressor is adjusted to control the temperature of an evaporator. When the vehicle engine stop request is issued when the vehicle is stopped, the compressor is kept at its maximum displacement and the vehicle engine is either stopped or activated depending on the temperature of the evaporator to control the on and off modes of the compressor.

6 Claims, 4 Drawing Sheets

VEHICLE AIR CONDITIONING SYSTEM

CROSS REFERENCE TO RELATED APPLICATION

The application is based upon, claims the benefit of priority of, and incorporates by reference the contents of prior Japanese Patent Application No. 2001-281937 filed on Sep. 17, 2001.

BACKGROUND OF THE INVENTION

1. Field of the Invention

The present invention relates to a vehicle air conditioning system mountable on a vehicle equipped with the control function of stopping a vehicle engine (internal combustion engine) automatically when the vehicle stops.

2. Description of the Related Art

In recent years, to benefit the environment and improve vehicle fuel economy, vehicles whose engines turn off when the vehicles stop (eco-run vehicles typified by hybrid cars) have been put to practical use. Eco-run vehicles of this kind are becoming increasingly popular.

Japanese Patent Laid-Open Publication No. 2000-179374 describes a driving control of a compressor in an eco-run vehicle which stops its vehicle engine automatically when the vehicle stops and addresses the case where a stopped condition of the vehicle engine coincides with a cooling command of the vehicle air conditioning system. Specifically, the publication describes a restarting of the vehicle engine to drive the compressor if the actual room temperature exceeds a passenger-determined passenger compartment temperature setting.

Since the foregoing publication does not mention that the compressor in the vehicle air conditioning system is a variable displacement type, the compressor is likely to be an ordinary, fixed displacement type. With a fixed displacement compressor, an electromagnetic clutch is arranged on a compressor pulley for transmitting engine rotation. This electromagnetic clutch is controlled in an on and off manner to switch the compressor on and off, whereby a cooling exchanger, or evaporator, is controlled with regard to temperature.

Nevertheless, the on and off switching of the compressor not only causes a shock but produces such problems that the temperature of the evaporator, or evaporator outlet air temperature, greatly varies. For this reason, luxury cars and other vehicles adopt air conditioning systems that employ a variable displacement compressor, configured and capable of continuous changes in discharge, to control the temperature of the evaporator.

The vehicle air conditioning systems using this variable displacement compressor are, however, not supposed to switch the compressor on and off, but are to keep the compressor operating continuously while adjusting the compressor discharge to control the temperature of the evaporator. Consequently, when a vehicle air conditioning system using a variable displacement compressor is mounted on the foregoing eco-run vehicle, and a stop condition of the vehicle engine coincides with a cooling command to the vehicle air conditioning system, then the vehicle engine sometimes must not be stopped. This results in a considerable decrease in the time possible for the eco-run vehicle to stop idling. The original effects of the eco-run vehicle, i.e., environmental protection and improved fuel economy then become impaired.

SUMMARY OF THE INVENTION

The present invention has been achieved in view of the foregoing. It is thus an object of the present invention to provide a vehicle air conditioning system mountable on a vehicle that has the control function of being able to stop its vehicle engine automatically while the vehicle is stopped (i.e. an eco-run vehicle). Additionally, the system will have a compressor that is driven by the vehicle engine and that is capable of changes in discharge capacity like a variable displacement compressor, and wherein engine stop time can be secured when the vehicle is stopped.

To achieve the foregoing object, a first aspect of the invention provides a vehicle air conditioning system mountable on a vehicle having a control function of issuing a stop request to a vehicle engine to stop the vehicle engine automatically when the vehicle is stopped. The system contains an engine driven compressor capable of changing its discharge capacity and an evaporator for cooling air to be blown into a passenger compartment. The evaporator is arranged on a suction side of the compressor. When the vehicle is running, the discharge capacity of the compressor is adjusted to control the evaporator temperature. When the vehicle engine stop request is issued when the vehicle is stopped, the discharge capacity of the compressor is kept at or above a predetermined capacity and the vehicle engine is either stopped or activated depending on the temperature of the evaporator. The temperature of the evaporator determines whether the compressor is turned on or off.

Specifically, in the first aspect, the discharge capacity of the compressor may be changed by various means. A variable displacement compressor may be used to change the discharge capacity, and a fixed displacement compressor, which is constant in displacement, may employ a transmission between the compressor and the vehicle engine. The transmission being capable of controlling a gear ratio by an exterior control signal to change the speed of the compressor.

According to the first aspect, when the vehicle is running, the discharge capacity of the compressor can be adjusted to favorably control the evaporator temperature with no great fluctuations. Additionally, the compressor power transmission system is prevented from a shock attributable to on-off operations.

When the vehicle is stopped, the vehicle engine is either stopped or started depending on the temperature of the evaporator (9). The temperature of the evaporator determines whether the compressor is turned on or off. The evaporator temperature, when the vehicle is stopped, can thus be controlled by turning the compressor on and off. This will ensure adequate passenger cooling. Even if the compressor needs to be operated for the sake of cooling (dehumidification) using the evaporator when the engine is stopped, the stop time of the vehicle engine can always be ensured because the compressor is controlled with its discharge capacity kept at or above a predetermined capacity. This ensures environmental protection and improved fuel economy which are the original aims of the eco-run vehicle.

Incidentally, the temperature of the evaporator to be detected or monitored is typically the outlet air temperature of the evaporator. Likewise, the fin surface temperature of the evaporator, the refrigerant evaporation temperature, the refrigerant piping surface temperature of the evaporator, and such, may be detected instead.

A second aspect of the present invention provides a vehicle air conditioning system according to the first aspect, wherein the predetermined capacity, when the vehicle is stopped, is a maximum capacity. In this case, the temperature of the evaporator can be lowered quickly within the operating period of the compressor so that the operating time (operating rate) of the vehicle engine, when stopped, is minimized to make best use of the original effects of the eco-run vehicle.

A third aspect of the present invention provides a vehicle air conditioning system according to the first or second aspect, wherein a temperature near a minimum temperature possible for the evaporator to be prevented from frosting while the compressor is turned on and off while the vehicle is stopped, is set as a first predetermined temperature (TE1). Additionally, a temperature sufficiently higher than the first predetermined temperature (TE1) is set as a second predetermined temperature (TE2), the temperature being an upper limit of a cooling temperature at which the increased temperature of the air blown into the passenger compartment starts to make a passenger feel uncomfortable. When the vehicle is stopped, the vehicle engine is activated when the temperature of the evaporator exceeds the second predetermined temperature (TE2), and is stopped when the temperature of the evaporator falls below the first predetermined temperature (TE1).

Consequently, the vehicle engine is not activated until the temperature of the evaporator exceeds the second predetermined temperature (TE2), i.e., the upper limit of cooling temperature at which the passenger starts to feel uncomfortable (in too hot or too humid conditions). The operating time of the vehicle engine can thus be effectively reduced while cooling is secured when the vehicle is stopped. Moreover, the vehicle engine, once activated, is kept operating until the temperature of the evaporator falls below the first predetermined temperature (TE1), which is the temperature near the minimum temperature possible before the evaporator generates frost. This prevents frequent activation of the vehicle engine when the vehicle is stopped in order to cool a vehicle passenger compartment.

In a fourth aspect of the present invention, the compressor uses a variable displacement compressor configured to be capable of changes in displacement. In this case, the displacement can be adjusted to exercise the operation and effects of each of the first through third aspects.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

(First Embodiment)

Figure 1:
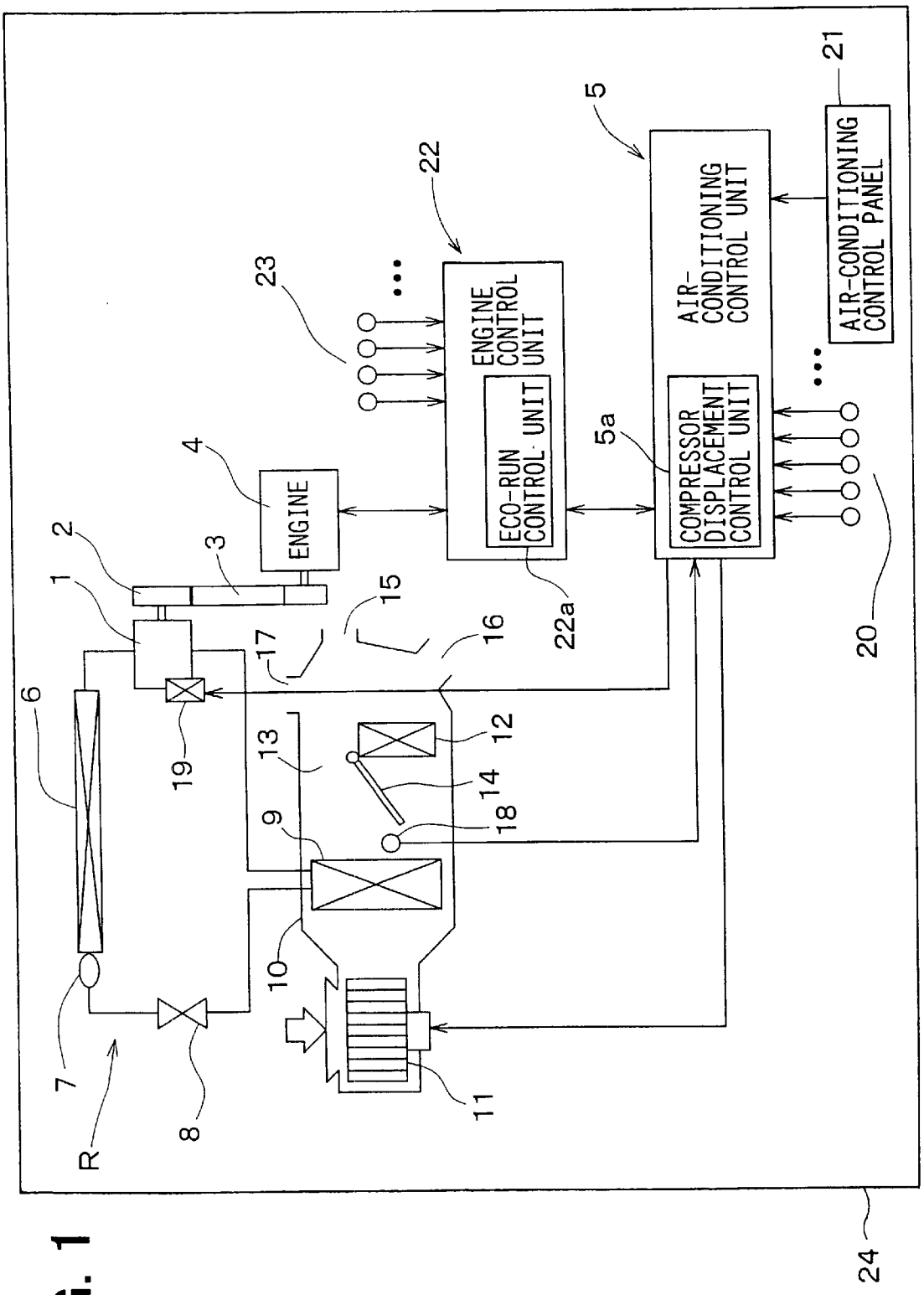
FIG. 1 is a block diagram of a first embodiment of the present invention.

FIG. 1 is a block diagram of a first embodiment of the present invention. The refrigeration cycle R of a vehicle air-cooling system is provided with a compressor 1 which draws, compresses, and discharges a refrigerant. The power of a vehicle engine 4 is transmitted to the compressor 1 through pulleys 2 and a belt 3.

As is well known, the vehicle engine 4 drives not only the air conditioning compressor 1 but also such auxiliaries as a generator, a hydraulic pump for a power steering unit, and a coolant pump via belts and other power transmitting means.

In the refrigeration cycle R, the compressor 1 discharges a superheated gas refrigerant of high temperature and high pressure, which flows into a condenser 6. Here, heat exchange is performed with the outside air sent by a cooling fan (not shown), so that the refrigerant is cooled for condensation. The refrigerant condensed in this condenser 6 then flows into a receiver 7, in which the refrigerant is separated into a gas and a liquid. A redundant liquid refrigerant in the refrigeration cycle R is stored inside the receiver 7.

The liquid refrigerant from this receiver 7 is decompressed by an expansion valve (decompressing means) 8 into a gas-liquid double phase state of low pressure. The low pressure refrigerant from this expansion valve 8 flows into an evaporator (cooling exchanger) 9. This evaporator 9 is arranged inside an air conditioning case 10 of the vehicle air conditioning system. The low pressure refrigerant flowing into the evaporator 9 absorbs heat from the air inside the air-cooling case 10 for evaporation. The outlet of the evaporator 9 is connected to the suction side of the compressor 1, so that the cycle components mentioned above constitute a closed circuit.

The air conditioning case 10 forms a ventilation duct through which air conditioning air is sent into the passenger compartment. The air conditioning case 10 contains a fan 11 which is arranged on the upstream side of the evaporator 9. An inside/outside air switch box (not shown) is arranged on the suction side of the fan 11 (the top side in FIG. 1). The air inside the passenger compartment (inside air) or the air outside the passenger compartment (outside air) switched and introduced through this inside/outside air switch box is sent into the air conditioning case 10 by the fan 11.

The air conditioning case 10 accommodates, on the downstream side of the evaporator 9, a hot water heater core (heat exchanger) 12 for heating air by using the hot water (coolant) of the vehicle engine 4 as a heat source. A bypass channel 13 is formed beside this hot water heater core 12. An air mix door 14 is provided to adjust the volume ratio between warm air and cool air that passes through the hot water heater core 12 and the bypass channel 13, respectively. This air mix door 14 is a temperature adjusting means for adjusting the temperature of the air blown into the passenger compartment by adjusting the volume ratio between the warm air and cool air.

Additionally, a face outlet 15, a foot outlet 16, and a defroster outlet 17 are formed at the downstream end of the air conditioning case 10. The face outlet 15 directs air toward the upper body portions of passengers, the foot outlet 16 directs air toward the feet of the passengers, and the defroster outlet 17 directs air toward the internal surface of the windshield. The outlets 15–17 are opened and closed by an outlet mode door (not shown). The air mix door 14 and outlet mode door mentioned above are driven by such electric driving means as servo motors via linkages or the like. The air conditioning case 10 also contains an evaporator outlet temperature sensor 18 made of a thermistor, which is placed just behind the air outlet of the evaporator 9.

For the compressor 1, the present embodiment uses an external variable displacement compressor which can be changed in displacement by an exterior control signal. For example, it is a swash plate compressor provided with a displacement changing device 19 which has an electromagnetic type pressure control device for controlling the pressure of the swash plate chamber through the use of the discharge pressure and suction pressure. The pressure of the swash plate chamber can be controlled to adjust the swash plate in a tilt angle so that the piston stroke, or compressor displacement, varies within the range of approximately 0% and 100% continuously.

Figure 2:
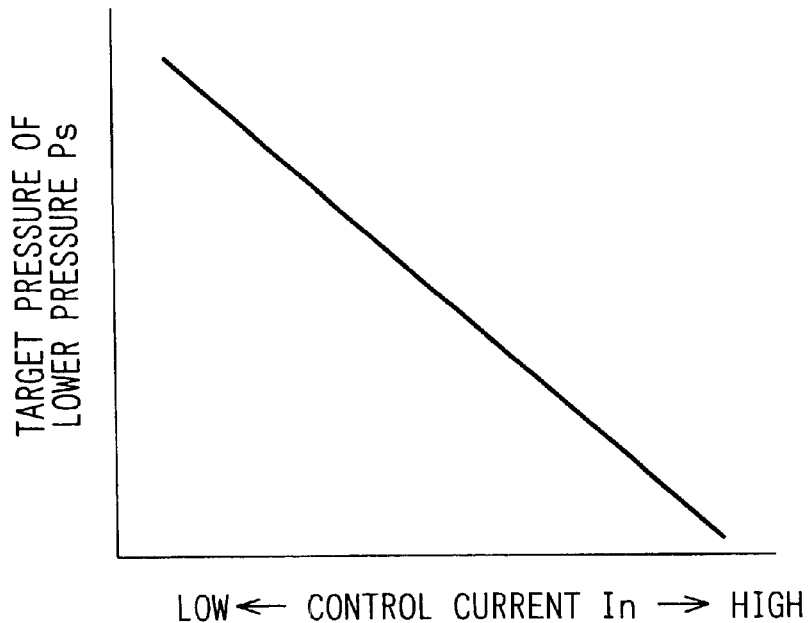
FIG. 2 is a graph showing a control characteristic of a variable displacement compressor according to the first embodiment of the present invention.

The energization of the foregoing displacement changing device 19 is controlled by a compressor displacement control unit 5a of an air conditioning control unit 5. For example, the displacement changing device 19 can undergo an increase in control current In so that the compressor displacement increases. That is, the control current In of the displacement changing device 19 determines the target pressure of the lower pressure (suction pressure) Ps in the refrigeration cycle directly. As shown in FIG. 2, the target pressure of the lower pressure Ps decreases in inverse proportion to the increasing control current In. An increase in control current In thus causes the compressor displacement to increase.

Consequently, the control current In (the displacement of the compressor 1) can be changed to adjust the lower pressure Ps, thereby controlling the cooling capacity of the evaporator 9 so that the temperature of the evaporator 9 (evaporator outlet temperature) equals a predetermined target temperature (the temperature corresponding to the target pressure of the lower pressure Ps). Controlling in this fashion prevents the evaporator 9 from frosting and saves power and usage of the compressor 1. Specifically, the adjustment of the control current In is effected by duty control. Alternatively, the control current In may be directly changed in value instead of the duty control.

The compressor 1 of the present embodiment has no electromagnetic clutch for on and off operation since it can be lowered to near 0% in displacement. Nevertheless, the compressor 1 may be provided with an electromagnetic clutch so that the energization of the electromagnetic clutch is interrupted to stop the operation of the compressor 1 when the displacement is lowered to near 0%.

The air conditioning control unit 5 receives detection signals from a group of known sensors 20 for detecting the passenger compartment inside air temperature, the outside air temperature, the amount of insolation, the engine coolant (hot water) temperature, and so on, aside from the sensor 18. Such operation signals as a temperature setting signal are also input from a group of operation switches on an air conditioning control panel 21 which is located near the automobile dashboard.

The air conditioning control unit 5 is also connected to an engine control unit 22 on the vehicle 24. These control units 5 and 22 are capable of mutual signal input and output. As is well known, the engine control unit 22 receives detection signals from a group of sensors 23 for detecting the running condition etc. of the vehicle engine 4. Based on the detection signals, the engine control unit 22 exercises comprehensive control with regard to the amount of fuel to be injected, the ignition timing, and so on. The engine control unit 22 has an eco-run control unit 22a which has the control function of stopping and restarting the vehicle engine 4 automatically. The eco-run control unit 22a automatically stops the vehicle engine 4 when an AND holds between an engine stop request from the vehicle side and engine stop permission from the air conditioning side. Otherwise, the eco-run control unit 22a activates the engine 4. The air conditioning control unit 5 and the engine control unit 22 are composed of separate microcomputers and their respective peripheral circuits, whereas these control units 5 and 22 may be integrated into a common microcomputer.

Figure 3:
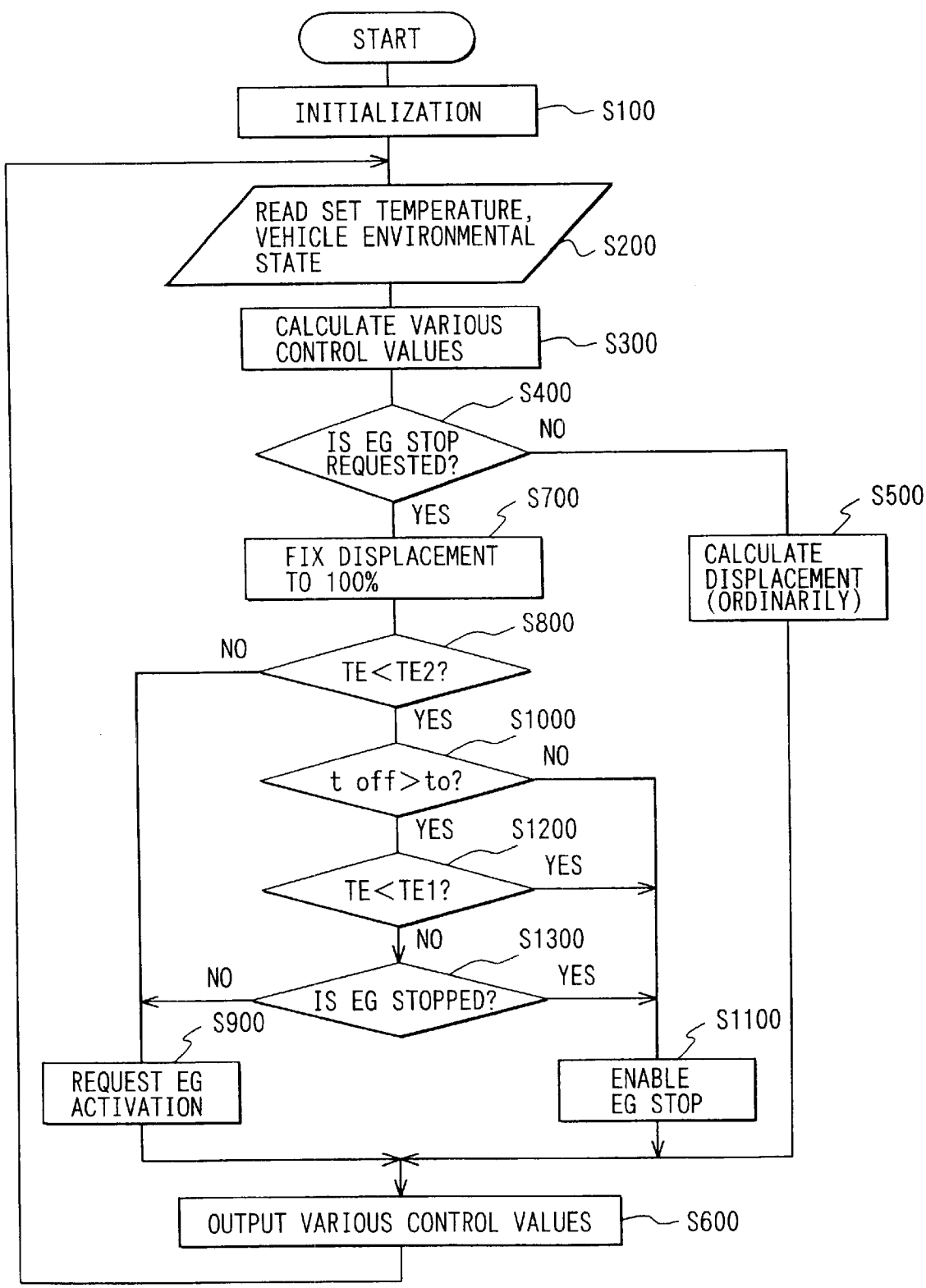
FIG. 3 is a flowchart showing the air conditioning control of the first embodiment of the present invention.

Now, description will be provided regarding the operation of the first embodiment. FIG. 3 shows the basic flow of air conditioning control for the microcomputer of the air conditioning control unit 5 to execute. At step S100, timers, control flags, and the like are initialized. At step S200, various signals are input (read in).

Specifically, sensor signals such as an evaporator outlet temperature TE from the sensor 18, an inside air temperature TR, an outside air temperature TAM, the amount of insolation TS, and an engine coolant temperature TW from the group of sensors 20, and operation signals from the group of operation switches on the air conditioning control panel 21 (a set temperature signal Tset etc.) are input. Moreover, the air conditioning control unit 5 and the engine control unit 22 communicate with each other to read an engine stop request signal and an engine activation request signal of the eco-run control unit 22a, and signals concerning the actual running condition of the engine including the engine speed and the vehicle speed.

Figure 4:
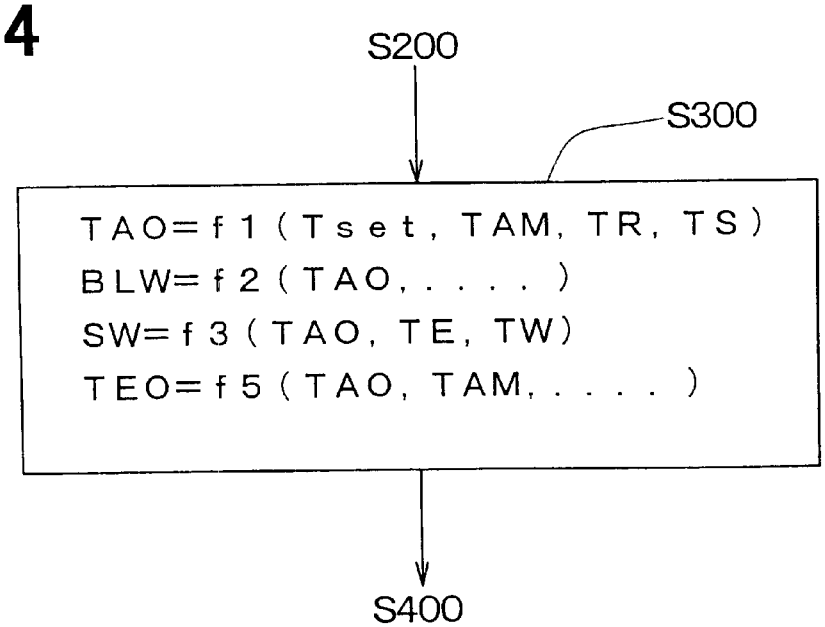
FIG. 4 is an explanatory diagram showing part of the control of FIG. 3.

Next, at step S300, various control values for automatic air conditioning control are calculated. The calculation of the control values may be the same as those that are publicly known. For a brief description, FIG. 4 shows the outline of the calculation at step S300. A target outlet temperature TAO is the passenger compartment outlet air temperature necessary to maintain the interior of the passenger compartment at the set temperature Tset set by a passenger, regardless of fluctuations in air conditioning heat load. TAO is calculated from the set temperature Tset, the outside air temperature TAM, the inside air temperature TR, and the amount of insolation TS.

A target air rate BLW of the fan 11 is calculated from TAO. A target opening SW of the air mix door 14 is calculated from TAO, the evaporator outlet temperature TE, and the engine coolant temperature TW. A target outlet temperature TEO of the evaporator 12 is calculated from TAO, TAM, and the like.

Next, the processing moves to step S400 to determine if the eco-run control unit 22a of the engine control unit 22 is issuing the engine stop request signal to the vehicle side. The eco-run control unit 22a issues the signal for requesting, of the vehicle side, an engine stop when it determines that the vehicle 24 is stopped and the remaining charge of the power supply battery mounted on the vehicle 24 is at or above a predetermined level. Specifically, the vehicle 24 can be judged as being stopped when the vehicle speed falls below a predetermined low speed (for example, 5 km/h or so). The remaining charge of the battery can be determined from the charging voltage of the battery or the like.

At step S400, if the eco-run control unit 22a is not issuing the signal of engine stop request to the vehicle side, then the vehicle is in regular driving mode and the vehicle engine 4 is in operation. In this case, the determination at step S400 is NO, so that the displacement of the compressor 1 is calculated ordinarily at step S500.

That is, at step S500, the control current In of the displacement changing device 19 of the compressor 1 is calculated so that the actual evaporator outlet temperature TE is maintained at the target outlet temperature TEO of the evaporator. More specifically, when the actual evaporator outlet temperature TE is higher than the target outlet temperature TEO of the evaporator, the control current In is increased. On the other hand, when the actual evaporator outlet temperature TE is lower than the target outlet temperature TEO of the evaporator, the control current In is decreased.

This control current In calculated at step S500 is output to the electromagnetic type pressure control device of the displacement changing device 19 at step S600. When the control current In is increased, the electromagnetic type pressure control device decreases the target pressure of the lower pressure Ps in the refrigeration cycle, whereby the displacement of the compressor 1 is increased. On the other hand, when the control current In is decreased, the electromagnetic type pressure control device increases the target pressure of the lower pressure Ps in the refrigeration cycle, whereby the displacement of the compressor 1 is decreased.

In this way, when the vehicle 24 is experiencing regular driving, the compressor 1 is driven by the engine 4 and the displacement of the compressor 1 is adjusted to maintain the evaporator outlet temperature TE at the target outlet temperature TEO.

The target outlet temperature TEO, as described above, is calculated from the target outlet temperature TAO of the air blown into the passenger compartment, the outside air temperature TAM, and so on. When the maximum cooling capacity is required, such as at higher outside air temperatures in the summertime, the calculation of TEO becomes a minimum temperature possible for the evaporator 9 to be prevented from frosting (for example, a temperature near 3° C., corresponding to TE1 in FIG. 5 to be seen later). When the cooling capacity may be smaller, such as at transition periods between seasons, the calculation of TEO is a higher temperature such as 12° C. or so (corresponding to TE2 in FIG. 5 to be seen later), with a reduction in the compressor driving power.

When it is determined at step S400 that the eco-run control unit 22a of the engine control unit 22 is issuing the engine stop request signal to the vehicle side, the processing moves to step S700 to fix the compressor 1 to a maximum displacement (100% displacement). Specifically, the calculation of the control current In is fixed to a maximum current. Consequently, the displacement changing device 19 fixes the target pressure of the lower pressure Ps to a minimum level, thereby maintaining the compressor 1 at the maximum displacement.

Next, at step S800, it is determined if the actual evaporator outlet temperature TE detected by the temperature sensor 18 is lower than a second predetermined temperature TE2 which is set in advance. Here, the second predetermined temperature TE2 is the upper limit cooling temperature (to be more specific, the outlet air temperature at the face outlet 15) at which the increased temperature of the air blown into the passenger compartment makes the passengers feel uncomfortable. For example, the second predetermined temperature TE2 is a temperature around 12° C.

If the actual evaporator outlet temperature TE reaches or exceeds the second predetermined temperature TE2, the processing moves to step S900 to issue the signal for an engine activation request in order to prevent the passengers from feeling uncomfortable with the cooling air. At step S600, the signal for an engine activation request is output to the eco-run control unit 22a of the engine control unit 22. Consequently, the eco-run control unit 22a performs a starting operation of the vehicle engine 4 based on the request from the air conditioning side so that the vehicle engine 4 is activated even if the condition of the vehicle side satisfies that of the engine stop request.

On the other hand, if it is determined at step S800 that the actual evaporator outlet temperature TE is lower than the second predetermined temperature TE2 which is set in advance, the processing moves to step S1000. At step S1000, it is determined if an elapsed time toff since the signal for an engine stop request is issued from the eco-run control unit 22a is greater than a predetermined time t0 which is set in advance. This determination is intended to prevent the vehicle engine 4 from being switched on or off frequently due to fluctuations in the condition on the air-cooling side when the vehicle 24 is stopped. For example, the predetermined time t0 is around 20 seconds.

If the determination at step S1000 is NO, the processing moves to step S1100 to issue an engine stop enabling signal. This signal is output to the eco-run control unit 22a of the engine control unit 22 at step S600, and the eco-run control unit 22a stops the vehicle engine 4.

If the foregoing elapsed time toff reaches or exceeds the predetermined time t0, the processing moves from step S1000 to S1200 to determine if the actual evaporator outlet temperature TE is lower than a first predetermined temperature TE1 which is set in advance. Here, the first predetermined temperature TE1 is the minimum temperature possible for the evaporator 9 to be prevented from frosting. In consideration of a response delay of the temperature sensor 18 and the like, the first predetermined temperature TE1 is usually set at around 3° C. If TE is lower than TE1, the processing moves to steps S1100 and S600, whereby the engine stop enabling signal is output to the eco-run control unit 22a of the engine control unit 22.

If TE is higher than or equal to TE1, the processing moves to step S1300 to determine whether the vehicle engine 4 is currently in operation or not. If the vehicle engine 4 is stopped, the processing moves to steps S1100 and S600, whereby the engine stop enabling signal is output to the eco-run control unit 22a of the engine control unit 22. If the vehicle engine 4 is in operation, the processing moves to steps S900 and S600, whereby the engine activation request signal is output to the eco-run control unit 22a of the engine control unit 22.

Incidentally, at step S600, the automatic control on air conditioning is effected by outputting not only the displacement control current In, the engine activation request signal, and the engine stop enabling signal mentioned above, but also such control values as those intended for the air rate control on the fan 11, the opening control on the air mix door 14, and the switching control on the outlet mode door (not shown). The control values are output to the actuators of the respective devices.

Figure 5:
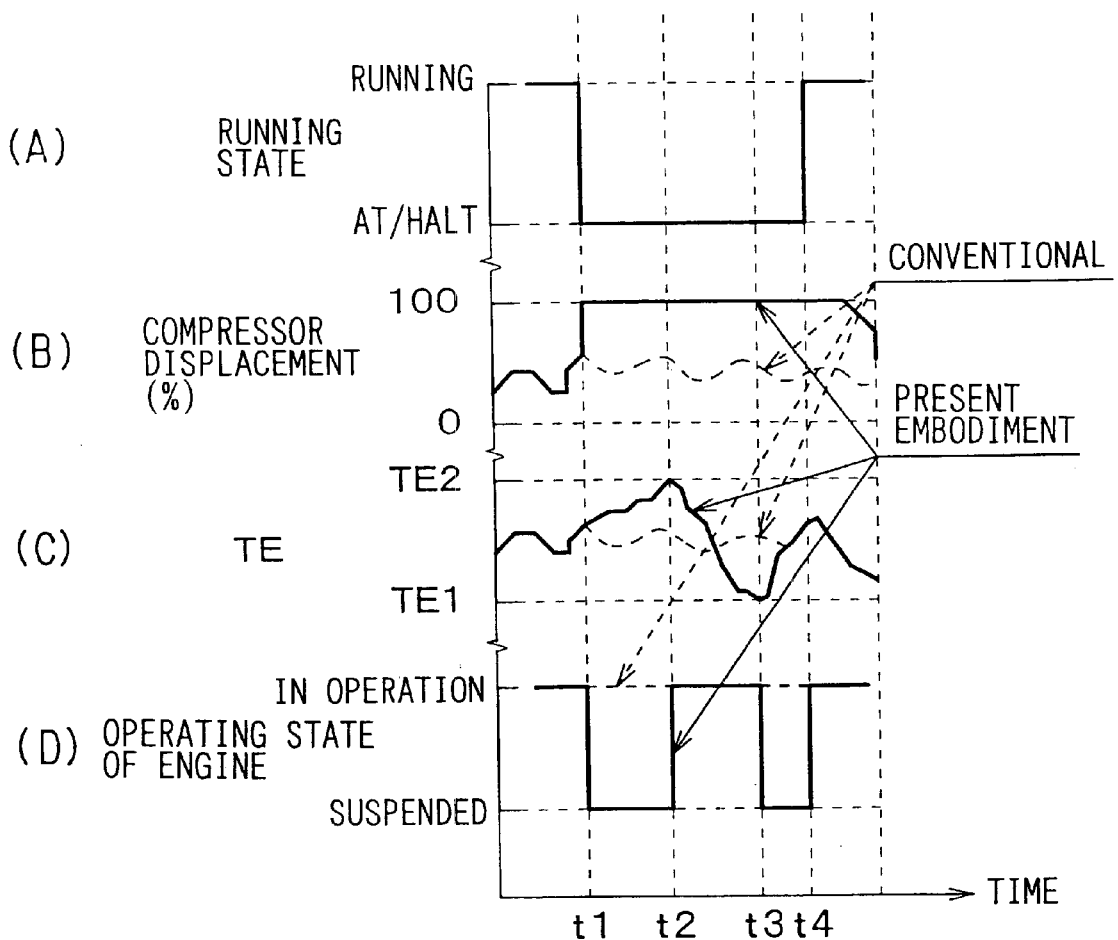
FIG. 5 is an explanatory diagram showing the operation of the first embodiment of the present invention.

Next, the operation and effects of the present embodiment will be described with reference to FIG. 5. Section A of FIG. 5 shows changes in the driving state of the vehicle 24, whether running or at a halt. Sections B, C, and D of FIG. 5 show how the compressor displacement, the actual evaporator outlet temperature TE, and the operating state of the vehicle engine vary with the changes, respectively.

In sections B, C, and D of FIG. 5, the broken lines show the case where the concept of the variable displacement control on a compressor according to the conventional art is applied as-is to the eco-run vehicle 24. According to the concept of the conventional art, the compressor is not switched on and off but remains driven while the evaporator outlet temperature TE is controlled through variable control in displacement. Thus, the vehicle engine 4 must be kept in operation as long as the operation command of the compressor 1 is issued even if the vehicle 24 is stopped. Consequently, in spite of being mounted on an eco-run vehicle 24, the vehicle engine 4 cannot be stopped when the operation command is given to the compressor 1 (when the cooling function of the evaporator 9 is necessary). This might impair the effects of the eco-run vehicle 24, i.e., improved environmental protection and improved fuel economy.

In contrast, the full lines show the case of the present embodiment. In the present embodiment, as can be seen from the foregoing operational description, the compressor 1 is fixed to the maximum displacement and switched on and off to control the evaporator outlet temperature TE when the vehicle 24 comes to a halt which stops the vehicle engine 4, or equivalently, when the eco-run control unit 22a of the engine control unit 22 issues the engine stop request signal to the vehicle side.

Specifically, the vehicle engine 4 is stopped to stop the compressor 1 before the actual evaporator outlet temperature TE exceeds the second predetermined temperature TE2. When TE exceeds TE2, the vehicle engine 4 is activated to operate the compressor 1 (to lower the evaporator temperature, and the cooling air temperature). When TE falls below the first predetermined temperature TE1 (TE1<TE2), the vehicle engine 4 is stopped to stop the compressor 1, to prevent frosting of the evaporator.

In this way, despite being a variable displacement type, the compressor 1 is brought into a control state as if it is a fixed displacement compressor under on and off control, when the vehicle engine 4 stops. Even in the case of the air conditioning system that adopts the variable displacement compressor 1, the vehicle engine 4 can thus be stopped intermittently as shown in section D of FIG. 5. Consequently, it is possible to make the best use of the invention to achieve environmental protection and improved fuel economy, which are the original aims of the eco-run vehicle 24.

When the vehicle engine stops, the compressor 1 is fixed to its maximum displacement for the reason that the vehicle engine 4 speed is minimized when it is stopped. That is, fixing the compressor 1 to the maximum displacement maximizes the refrigerant discharge capacity (refrigerant discharge rate) of the compressor 1. The cooling capacity of the evaporator 9 is maximized accordingly, so that the evaporator outlet temperature TE can be lowered from the second predetermined temperature TE2 to the first predetermined temperature TE1 quickly. Hence, the operating time of the vehicle engine 4 when the vehicle 24 is stopped (the duration between times t2 and t3 in FIG. 5) can be decreased to a minimum, which minimizes the operating rate of the vehicle engine 4.

Fixing the compressor 1 to its maximum displacement is thus effective at minimizing the operating rate of the vehicle engine 4 when the vehicle 24 is stopped, whereas the embodiment of the present invention is not limited to the maximum-displacement fixing. The compressor displacement may be maintained to or above a predetermined displacement, for example, 60% displacement when the vehicle 24 is stopped with the compressor being controlled by being turned on and off.

(Second Embodiment)

Figure 6:
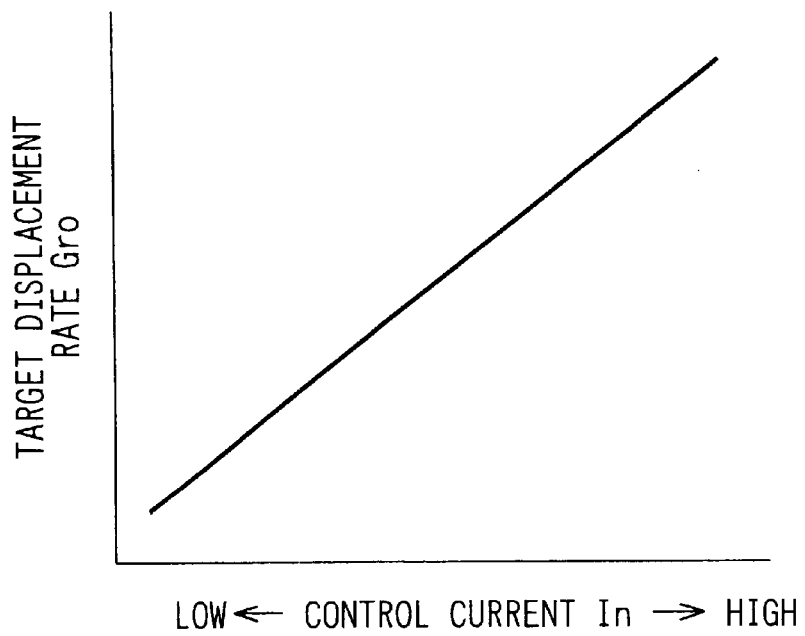
FIG. 6 is a graph showing a control characteristic of a variable displacement compressor according to a second embodiment of the present invention.

The first embodiment uses the external variable displacement compressor 1 in which a target pressure of the lower pressure Ps is set by the control current In of the displacement changing device 19 as shown in FIG. 2. The displacement is adjusted to maintain the lower pressure Ps to the target pressure (lower pressure control type). The second embodiment, on the other hand, uses an external variable displacement compressor 1 in which a target discharge rate Gro of the compressor discharge rate is set by the control current In of the displacement changing device 19 as shown in FIG. 6. The displacement is adjusted to maintain the compressor discharge rate to the target discharge rate Gro (discharge rate control type).

To be more specific, the external variable displacement compressor 1 of a discharge rate control type according to the second embodiment has a throttle unit on its discharge side. A pressure difference arising across this throttle unit is proportional to the discharge rate. Consequently, when the displacement is adjusted so that the pressure difference across the throttle unit matches a target pressure difference, the compressor discharge rate is maintained to the target discharge rate Gro.

For that purpose, the displacement changing device 19 is provided with an electromagnetic mechanism whose electromagnetic force is determined by the control current In. This electromagnetic mechanism is used to determine an electromagnetic force corresponding to the foregoing target pressure difference. The variable displacement device 19 is also provided with a valve mechanism which changes its valve opening depending on a balance between the electromagnetic force corresponding to the target pressure difference and the pressure difference across the throttle unit.

By changing the valve opening of this vale mechanism to control the pressure of the swash plate chamber, the swash plate can be adjusted with regard to tilt angle so that the compressor displacement varies within the range of approximately 0% and 100% continuously. The external variable displacement compressor 1 of such a discharge rate control type can be used to provide the same operation and effects as those of the first embodiment.

(Other Embodiments)

In the foregoing first and second embodiments, a compressor capable of changes in discharge capacity, or the variable displacement compressor 1, is used to adjust the displacement and thereby control the outlet air temperature TE of the evaporator 9. The discharge capacity of a compressor, i.e., the compressor discharge rate (the flow rate of the refrigerant per unit time) is expressed as the product of the displacement and the compressor speed of the compressor 1. Hence, the compressor 1 may be of a fixed displacement if a transmission whose gear ratio can be changed continuously or in multiple steps is interposed between the compressor 1 and the engine 4. In this case, the gear ratio of the transmission is adjusted to change the refrigerant discharge rate of the compressor 1.

Specifically, given that the gear ratio is the compressor speed (output speed)/the engine speed (input speed), the gear ratio is increased to exercise the control of the first and second embodiments toward greater displacements (toward higher control currents In) while the vehicle 24 is running. On the contrary, the gear ratio is decreased to exercise control of the first and second embodiments toward smaller displacements (toward lower control currents In).

To fix the compressor 1 to its maximum displacement in step S700 when the vehicle 24 is stopped, the foregoing gear ratio can be maximized to provide the same operation and effects as those of the first and second embodiments.

In the first embodiment, the compressor 1 is fixed to its maximum displacement in step S700 when the vehicle 24 is stopped. Nevertheless, the displacement of the compressor 1 may be adjusted according to the air conditioning heat load when the vehicle 24 is stopped instead of being fixed to or near the maximum displacement.

In other words, when the vehicle engine 4 is activated to operate the compressor 1 when the vehicle 24 is stopped, the displacement of the compressor 1 may be adjusted within the range of a predetermined displacement and above according to the air conditioning heat load.

In the first embodiment, the signal to make the vehicle engine 4 stop when the vehicle 24 is stopped, or the engine stop request signal, is received from the eco-run control unit 22a of the engine control unit 22. Alternatively, the detection signal of the vehicle speed sensor may be input to the air conditioning control unit 5. In this case, the air conditioning control unit 5 directly determines when a vehicle is slowing (the state that the vehicle speed falls below a certain speed) based on the detection signal of the vehicle speed sensor, and switches the control of the compressor 1 from variable displacement control to on and off control.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air conditioning system having a control function of issuing a stop request to a vehicle engine to stop the vehicle engine automatically when the vehicle is stopped, the system comprising:
    a compressor capable of changes in discharge capacity, the compressor being driven by the vehicle engine; and
    an evaporator for cooling air to be blown into a passenger compartment, the evaporator being arranged on a suction side of said compressor, wherein:
        when the vehicle is running, the discharge capacity of the compressor is adjusted to control said evaporator temperature; and
        when the stop request of the vehicle engine is issued when the vehicle is stopped, the discharge capacity of said compressor is kept at or above a predetermined capacity and said vehicle engine is either stopped or activated depending on the temperature of said evaporator to control an on and off mode of the compressor.

2. The vehicle air conditioning system according to claim 1, wherein said predetermined capacity is a maximum capacity.

3. The vehicle air conditioning system according to claim 2, wherein:
    a first temperature near a minimum temperature possible for the evaporator to be prevented from frosting while the compressor is controlled in an on and off mode when the vehicle is stopped is set as a first predetermined temperature;
    a second temperature sufficiently higher than the first predetermined temperature is set as a second predetermined temperature, the second temperature being an upper limit of a cooling temperature, above which the temperature of the air blown into the passenger compartment makes a passenger feel uncomfortable; and
    when the vehicle is stopped, the vehicle engine is activated when the temperature of the evaporator exceeds the second predetermined temperature, and the engine is stopped when the temperature of the evaporator falls below said first predetermined temperature.

4. The vehicle air conditioning system according to claim 3, wherein said compressor is a variable displacement compressor capable of changes in displacement.

5. The vehicle air conditioning system according to claim 1, wherein:
    a first temperature near a minimum temperature possible for the evaporator to be prevented from frosting while the compressor is controlled in an on and off mode when the vehicle is stopped is set as a first predetermined temperature;
    a second temperature sufficiently higher than the first predetermined temperature is set as a second predetermined temperature, the second temperature being an upper limit of a cooling temperature, above which the temperature of the air blown into the passenger compartment makes a passenger feel uncomfortable; and
    when the vehicle is stopped, the vehicle engine is activated when the temperature of the evaporator exceeds the second predetermined temperature, and the engine is stopped when the temperature of the evaporator falls below said first predetermined temperature.

6. The vehicle air conditioning system according to claim 1, wherein said compressor is a variable displacement compressor capable of changes in displacement.

* * * * *